(12) United States Patent
Osada et al.

(10) Patent No.: US 6,353,462 B1
(45) Date of Patent: Mar. 5, 2002

(54) TELEVISION SIGNAL AND FM BROADCAST SIGNAL DEMODULATOR AND TELEVISION SIGNAL AND FM BROADCAST SIGNAL RECEIVER

(75) Inventors: Shigeru Osada, Shinchi-machi; Yasuharu Kudo; Masashi Suzuki, both of Soma; Toshiro Furuta, Iwanuma, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/126,255

(22) Filed: Jul. 30, 1998

(30) Foreign Application Priority Data

Jul. 30, 1997 (JP) .............................................. 9-204809

(51) Int. Cl.⁷ ........................... H04N 5/44; H04N 5/455
(52) U.S. Cl. ....................... 348/726; 348/725; 348/729; 348/705; 455/45; 455/229
(58) Field of Search ................................ 348/726, 725, 348/727, 728, 729, 737, 738, 705, 706; 455/42, 45, 205, 229; H04N 5/44, 5/455

(56) References Cited

U.S. PATENT DOCUMENTS

| 4,272,788 A | * | 6/1981 | Ogtia | 348/729 |
| 4,410,856 A | * | 10/1983 | van Zanten | 348/638 |
| 4,777,503 A | * | 10/1988 | Kramer | 348/705 |
| 5,166,798 A | * | 11/1992 | Cho | 348/729 |
| 5,313,660 A | * | 5/1994 | Lindenmeier et al. | 348/729 |
| 5,493,346 A | * | 2/1996 | Yamashita | 348/726 |
| 5,598,221 A | * | 1/1997 | Miyahara et al. | 348/554 |
| 5,673,088 A | * | 9/1997 | Nah | 348/555 |

FOREIGN PATENT DOCUMENTS

| JP | 405191307 | * | 7/1993 |
| JP | 405206906 | * | 8/1993 |
| JP | 6-224797 | | 8/1994 |
| JP | 406224797 | * | 8/1994 |
| KP | 6-121240 | | 4/1994 |

* cited by examiner

*Primary Examiner*—Michael Lee
*Assistant Examiner*—Linus M. Lo
(74) *Attorney, Agent, or Firm*—Brinks Hofer Gilson & Lione

(57) ABSTRACT

A demodulator is able to demodulate a television signal and an FM broadcast signal by a common demodulator. Also, a receiver is able to output television video signal and audio signal and an audio signal of the FM broadcast signal by the common demodulator without using a second mixer for frequency-converting the FM broadcast signal to provide an audio intermediate frequency signal of 10.7 MHz when the FM broadcast signal is received. A demodulator includes a first input terminal, a second input terminal, a third input terminal and a change-over switch and wherein the change-over switch connects the first input terminal, a video detector and a video carrier generator to receive the television signal and the change-over switch connects the third input terminal, the video detector and the video carrier generator to receive the FM broadcast signal.

5 Claims, 4 Drawing Sheets

TELEVISION SIGNAL AND FM BROADCAST SIGNAL DEMODULATOR AND TELEVISION SIGNAL AND FM BROADCAST SIGNAL RECEIVER

BACKGROUND OF THE INVENTION

1. Field of the Invention

The present invention relates to a television signal and FM broadcast signal demodulator and a television signal and FM broadcast signal receiver.

2. Description of the Prior Art

A prior-art television signal and FM broadcast signal receiver will be described with reference to FIG. 6. Referring to FIG. 6, a VHF band television signal or an FM broadcast signal is inputted from an input terminal 31 of a receiver to a VHF tuner unit 32. The VHF tuner unit 32 includes a tuner, a mixer, a local oscillator or the like, though not shown, to select a received television signal or FM broadcast signal from the inputted television signal or FM broadcast signal and in which the mixer and the local oscillator frequency-convert a selected television signal or FM broadcast signal to provide a television intermediate frequency signal IF. Here, the intermediate frequency signal IF is frequency-converted in such a manner that a television video intermediate frequency signal VIF may have a frequency of 58.75 MHz. A frequency of a television audio intermediate frequency signal SIFtv becomes 54.25 MHz accordingly. Also, an FM audio intermediate frequency signal SIFfm is frequency-converted in such a manner that its frequency becomes 54.25 MHz which is the same frequency as that of this television audio intermediate frequency SIFtv.

Then, when a television signal is received, the video intermediate frequency signal VIF and the audio intermediate frequency signal SIFtv are inputted through an intermediate frequency circuit 33 to a demodulator 34. The demodulator 34 demodulates the video intermediate frequency signal VIF and the audio intermediate frequency signal SIFtv to provide a video signal V and an audio signal Atv. Also, when an FM broadcast signal is received, a second mixer 35 and a second local oscillator 36 frequency-convert an FM audio intermediate frequency signal SIFfm (54.25 MHz) outputted from a VHF tuner unit 32 to provide an audio intermediate frequency signal of 10.7 MHz, and an FM detector 37 outputs an audio signal Afm. The VHF tuner unit 32 is able to also receive an FM broadcast signal having a frequency lower than that of the television signal accordingly.

FIG. 7 is a block diagram of the demodulator 34 for demodulating the television signal. As shown in FIG. 7, the intermediate frequency signal IF from the intermediate frequency circuit 33 contains the video intermediate frequency signal VIF and the audio intermediate frequency signal SIFtv. These video and audio intermediate frequency signals VIF and SIFtv are inputted to a video intermediate frequency amplifier (simply referred to as "VIFAMP") 41 and an audio intermediate frequency amplifier (simply referred to as "SIFAMP") 42, respectively. Then, the video intermediate frequency signal VIF that was amplified by the VIFAMP 41 is inputted to a video detector 43 and an automatic phase controller (simply referred to as "APC") 44. The APC 44 phase-compares an oscillation signal from a voltage-controlled oscillator (simply referred to as "VCO") 45 and the video intermediate frequency signal VIF. A compared voltage corresponding to a phase difference is inputted from the APC 44 to the VCO 45. As a consequence, the VCO 45 oscillates at 58.75 MHz which is a frequency of a video carrier of the video intermediate frequency signal VIF. Thus, the APC 44 and the VCO 45 comprise a PLL (phase-locked loop) circuit and serves as a video carrier generator to generate a video carrier. This video carrier is inputted to the video detector 43.

Then, the video detector 43 synchronously detects the video intermediate frequency signal VIF by the video carrier of 58.75 MHz to provide a video signal V.

The audio intermediate frequency signal SIFtv that was amplified by the SIFAMP 42 is inputted to an audio intermediate frequency detector 46, and the video carrier from the VCo 45 also is inputted to this audio intermediate frequency detector 46. Then, since an audio carrier of the audio intermediate frequency signal SIFtv is 54.25 MHz, the audio intermediate frequency detector 46 outputs a second audio intermediate frequency signal SIF2 of 4.5 MHz which is a difference of frequencies between the video carrier and the audio carrier. That is, the audio intermediate frequency detector 46 intercarrier-detects the audio intermediate frequency signal SIFtv to provide the second audio intermediate frequency signal SIF2.

Then, this second audio intermediate frequency signal SIF2 is inputted through a bandpass filter 47 having a center frequency of 4.5 MHz to an FM detector 48. This FM detector 48 outputs an audio signal Atv.

On the other hand, when an FM broadcast signal is received, since the intermediate frequency signal SIFfm based on the FM broadcast signal outputted from the intermediate frequency circuit 33 does not contain the video intermediate frequency signal VIF, the VCO 45 is unable to output the carrier of 58.75 MHz. Accordingly, the audio intermediate frequency detector 46 also is unable to output the second audio intermediate frequency signal SIF2 of 4.5 MHz. As a result, the demodulator 34 cannot FM-detect the FM broadcast signal.

In order to solve the above-mentioned problem, as mentioned before, after the second mixer 35 and the second local oscillator 36 have frequency-converted the audio intermediate frequency signal SIFfm based on the FM broadcast signal from the VHF tuner 32 to provide the audio intermediate frequency signal of 10.7 MHz, the FM detector 37 FM-detects this audio intermediate frequency signal.

As described above, according to the prior-art circuit arrangement, since the demodulator 34 for obtaining the television video signal V and audio signal Atv cannot FM-detect the FM broadcast signal, the second mixer 35 and the second local oscillator 36 are used to frequency-convert the FM broadcast signal to provide the audio intermediate frequency signal of 10.7 MHz, and then the audio intermediate frequency signal is FM-detected. For this reason, since the prior-art receiver required the second mixer 35, the second local oscillator 36 and the FM detector 37 extra, the circuit arrangement of the prior-art receiver becomes complicated, and the prior-art receiver becomes expensive unavoidably.

SUMMARY OF THE INVENTION

In view of the aforesaid aspect, it is an object of the present invention to provide a television signal and FM broadcast signal demodulator in which both of a television signal and an FM broadcast signal may be demodulated only by switching the reception of the television signal and the reception of the FM broadcast signal.

It is another object of the present invention to provide a television signal and FM broadcast signal receiver in which, when an FM broadcast signal is received, a common demodulator may obtain television video signal and audio signal and an audio signal of FM broadcast signal without using a second mixer for frequency-converting an audio intermediate frequency signal of 54.25 MHz to provide an audio intermediate frequency signal of 10.7 MHz.

According to a first aspect of the present invention, there is provided a television signal and FM broadcast signal demodulator which is comprised of a first input terminal to which a video intermediate frequency signal in a television intermediate frequency signal is inputted, a second input terminal to which an audio intermediate frequency signal in the intermediate frequency signal or an FM broadcast signal, which is frequency-converted so as to have the same frequency as that of the audio intermediate frequency signal, is inputted, a third input terminal to which a pseudo carrier having the same frequency as that of a video carrier in the intermediate frequency signal is inputted, a change-over switch for selecting either the video intermediate frequency signal inputted to the first input terminal or the pseudo carrier inputted to the third input terminal, a video detector to which one of the video intermediate frequency signal and the pseudo carrier selected by the change-over switch is inputted, an audio intermediate frequency detector to which the audio intermediate frequency signal or the FM broadcast signal inputted to the second input terminal is inputted and generating a second audio intermediate frequency signal, an FM detector for detecting the second audio intermediate frequency signal to provide an audio signal, and a video carrier generator to which the one signal is inputted, reproducing the video carrier and inputting the reproduced video carrier into the video detector and the audio intermediate frequency detector, wherein the change-over switch connects the first input terminal, the video detector and the video carrier generator to receive the television signal and the change-over switch connects the third input terminal, the video detector and the video carrier generator to receive the FM broadcast signal.

According to a second aspect of the present invention, there is provided a television signal and FM broadcast signal demodulator which is comprised of a first input terminal to which a video intermediate frequency signal in a television intermediate frequency signal is inputted, a second input terminal to which an audio intermediate frequency signal in the intermediate frequency signal and an FM broadcast signal, which is frequency-converted so as to have the same frequency as that of the intermediate frequency signal, are inputted, a third input terminal to which a pseudo carrier having the same frequency as that of a video carrier in the intermediate frequency signal is inputted, a video detector to which the video intermediate frequency signal inputted to the first input terminal is inputted and outputting a video signal, an audio intermediate frequency detector to which the audio intermediate frequency signal inputted to the second input terminal is inputted and generating a second audio intermediate frequency signal, an FM detector for detecting the second audio intermediate frequency signal to provide an audio signal, a video carrier generator to which said video intermediate frequency signal is inputted, reproducing the video carrier and inputting the reproduced video carrier into the video detector, and a change-over switch connected between the video carrier generator and the audio intermediate frequency detector, wherein the change-over switch connects the video carrier generator and the audio intermediate frequency detector to receive the television signal and the change-over switch connects the third input terminal and the audio intermediate frequency detector to receive said FM broadcast signal.

According to a third aspect of the present invention, there is provided a television signal and FM broadcast signal receiver which is comprised of a VHF tuner unit to which a television signal or an FM broadcast signal is inputted and frequency-converting the inputted television signal or FM broadcast signal to provide an intermediate frequency signal having a television intermediate frequency, a demodulating unit for demodulating the intermediate frequency signal to provide television video signal and audio signal, and a pseudo carrier generator for generating a pseudo carrier having the same frequency as that of a video carrier in the intermediate frequency signal, wherein the demodulating unit includes a video detector to which the video intermediate frequency signal in the intermediate frequency signal is inputted and outputting a video signal, a video carrier generator to which the video intermediate frequency signal is inputted and reproducing the video carrier based on the inputted video intermediate frequency signal, an audio intermediate frequency detector to which an audio intermediate frequency signal in the intermediate frequency signal and the video carrier reproduced by the video carrier generator are inputted and outputting a second audio intermediate frequency signal, and an FM detector for detecting the second audio intermediate frequency signal to provide an audio signal and in which when the FM broadcast signal is received, the pseudo carrier is inputted to the audio intermediate frequency detector instead of the video carrier based on the intermediate frequency signal.

In accordance with a fourth aspect of the present invention, there is provided a television signal and FM broadcast signal receiver which further comprises a change-over switch for selecting either the video intermediate frequency signal or the pseudo carrier and wherein the change-over switch inputs the video intermediate frequency signal into the video detector and the video carrier generator when the television signal is received, the change-over switch inputs the pseudo carrier into the video detector and the video carrier generator and the pseudo carrier signal from the video carrier generator is inputted to the audio intermediate frequency detector when the FM broadcast signal is received.

In accordance with a fifth aspect of the present invention, there is provided a television signal and FM broadcast signal receiver which further comprises a change-over switch connected between the video carrier generator and the audio intermediate frequency detector and wherein the change-over switch inputs the video carrier from the video carrier generator into the audio intermediate frequency detector when the television signal is received, and the change-over switch inputs the pseudo carrier from the pseudo carrier generator into the audio intermediate frequency detector when the FM broadcast signal is received.

DESCRIPTION OF THE PREFERRED EMBODIMENTS

Hereinafter, a television signal and FM broadcast signal receiver according to a first embodiment of the present invention will be described with reference to FIG. 2, and a demodulator for use in the television signal and FM broadcast signal receiver of the present invention shown in FIG. 1 will be described with reference to FIG. 2.

Figure 1:
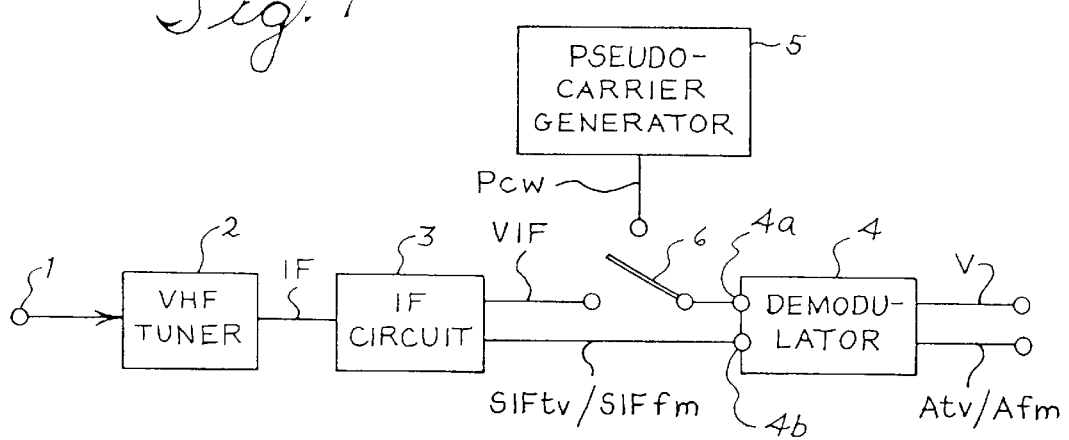
FIG. 1 is a block diagram showing a television signal and FM broadcast signal receiver according to a first embodiment of the present invention.

Initially referring to FIG. 1, a VHF-band television signal and an FM broadcast signal are inputted from an input terminal 1 of a receiver to a VHF tuner unit 2. The VHF tuner unit 2 includes a tuner, a mixer, a local oscillator or the like, not shown, to select a received television signal or FM broadcast signal from the inputted television signal or FM broadcast signal. The mixer and the local oscillator, not shown, frequency-convert the selected television signal or FM broadcast signal into an intermediate frequency signal IF having a television intermediate frequency. Here, the intermediate frequency signal IF is frequency-converted in such a manner that a frequency of a television video intermediate frequency signal VIF becomes 58.75 MHz. Also, a frequency of a television audio intermediate frequency signal SIFtv becomes 54.25 MHz. Further, the FM broadcast signal is frequency-converted into an FM audio intermediate frequency signal SIFfm having a frequency of 54.25 MHz which is the same frequency as that of this television audio intermediate frequency signal SIFtv. Thus, when the television signal is received, the intermediate frequency signal IF contains the video intermediate frequency signal VIF and the audio intermediate frequency signal SIFtv. When the FM broadcast signal is received, the intermediate frequency signal IH contains only the FM audio intermediate frequency signal SIFfm.

Then, the intermediate frequency signal IF is inputted through an intermediate frequency circuit 3 to a demodulator 4. The demodulator 4 includes a first input terminal 4a to which the video intermediate frequency signal VIF is inputted and a second input terminal 4b to which the television audio intermediate frequency signal SIFtv or the FM audio intermediate frequency signal SIFfm is inputted. The video intermediate frequency signal VIF from the intermediate frequency circuit 3 or a pseudo carrier Pcw from a pseudo carrier generator 5 is inputted through a change-over switch 6 to the first input terminal 4a of the demodulator 4. The television audio intermediate frequency signal SIFtv or the FM audio intermediate frequency signal SIFfm from the intermediate frequency circuit 3 is inputted to the second input terminal 4b of the demodulator 4. The pseudo carrier generator 5 is adapted to generate the pseudo carrier Pcw having the same frequency 58.75 MHz as that of the video carrier of the video intermediate frequency signal VIF.

Then, when the television signal is received, the change-over switch 6 inputs the video intermediate frequency signal VIF from the intermediate frequency circuit 3 to the input terminal 4a of the modulator 4. When the FM broadcast signal is received, the change-over switch 6 inputs the pseudo carrier Pcw from the pseudo carrier generator 5 to the input terminal 4a of the modulator 4. Moreover, the television audio intermediate frequency signal SIFtv or the FM audio intermediate frequency signal SIFfm are outputted from the intermediate frequency circuit 3, and are both inputted to the second input terminal 4b of the demodulator 4. Then, the demodulator 4 outputs the television video signal V and audio signal Atv when the television signal is received, and outputs the FM audio signal Afm when the FM broadcast signal is received.

Next, an operation of the demodulator 4 will be described with reference to FIG. 2. Initially, when the television signal is received, the intermediate frequency signal IF from the intermediate frequency circuit 3 contains the video intermediate frequency signal VIF and the audio intermediate frequency signal SIFtv, and these intermediate frequency signals VIF and SIFtv are inputted to a video intermediate frequency amplifier (simply referred to as "VIFAMP") 11 and an audio intermediate frequency amplifier (simply referred to as "SIFAMP") 12, respectively. Then, the video intermediate frequency signal VIF that was amplified by the VIFAMP 11 is inputted to a video detector 13 and an automatic phase controller (simply referred to as "APC") 14. The APC 14 phase-compares an oscillation signal from a voltage-controlled oscillator (simply referred to as "VCO") 15 and the video intermediate frequency signal VIF, and a compared voltage corresponding to a phase difference therebetween is inputted to the VCO 15.

The APC 14 and the VCO 15 comprise a PLL circuit accordingly, and the VCO 15 oscillates at a video carrier (58.75 MHz) of the video intermediate frequency signal VIF. Also, the APC 14 and the VCO 15 constitute a video carrier generator 16 for reproducing a video carrier from the video intermediate frequency signal VIF. Then, the video carrier from the VCO 15 is inputted to the video detector 13.

The video intermediate frequency signal VIF and the video carrier of 58.75 MHz are inputted to the video detector 13, and the video detector 13 synchronously detects the video intermediate frequency signal VIF to provide a video signal V.

On the other hand, while the audio intermediate frequency signal SIFtv that was amplified by the SIFAMP 12 is inputted to an audio intermediate frequency detector 17, the video carrier from the VCO 15 also is inputted to this audio intermediate frequency detector 17. Then, since the audio carrier of the audio intermediate frequency signal SIFtv has a frequency of 54.25 MHz, the audio intermediate frequency detector 17 outputs a second intermediate frequency signal SIF2 having a frequency of 4.5 MHz which is a difference between the frequencies of these carriers. Specifically, the audio intermediate frequency detector 17 intercarrier-detects the audio intermediate frequency signal SIFtv to provide the second intermediate frequency signal SIF2.

Then, the second audio intermediate frequency signal SIF2 is inputted through a bandpass filter 18 having a center frequency of 4.5 MHz to an FM detector 19, and the FM detector 19 outputs an audio signal Atv.

Then, when the FM broadcast signal is received, since the intermediate frequency signal IF outputted from the intermediate frequency circuit 3 does not contain the video intermediate frequency signal VIF, the video carrier cannot be reproduced from the VCO 15. Therefore, instead of the video intermediate frequency signal VIF, a pseudo carrier (58.75 MHz) from the pseudo carrier generator 5 provided in the outside of the demodulator 4 is inputted through the change-over switch 6 to the APC 14 of the demodulator 4.

As a result, the VCO 15 outputs the pseudo carrier Pcw of 58.75 MHz, and this pseudo carrier is inputted to the audio intermediate frequency detector 17. Accordingly, the audio intermediate frequency detector 17 generates the second audio intermediate frequency signal SIF2 based on the pseudo carrier Pcw and the FM audio intermediate frequency signal SIFfm in the same manner as that used when the television signal is received. Then, an FM detector 19 outputs an audio signal Afm.

Figure 7:
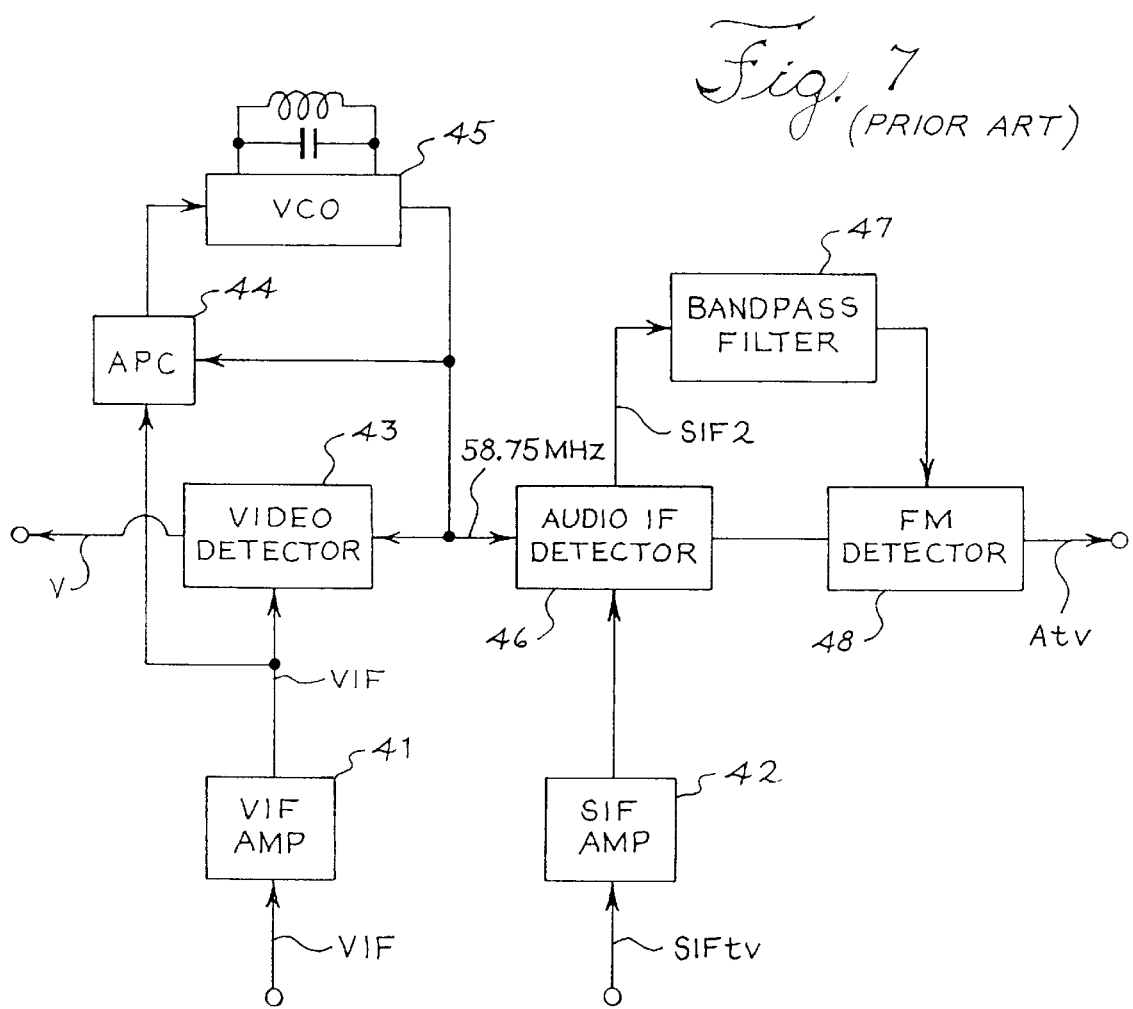
FIG. 7 is a circuit diagram of a demodulator for use in the television signal and FM broadcast signal receiver according to the prior art.

As set forth above, since the television signal and FM broadcast signal receiver according to the present invention includes the pseudo carrier generator 5 for generating the signal having the same frequency as that of the video carrier of the television video intermediate frequency signal VIF and in which the pseudo carrier Pcw of 58.75 MHz from the pseudo carrier generator 5 is inputted to the audio intermediate frequency detector 17 when the FM broadcast signal is received, it is possible to obtain the FM audio signal Afm by using the arrangement for obtaining the television audio signal Atv as it is. Accordingly, since the FM intermediate frequency signal SIFfm need not be frequency-converted into the signal having the frequency of 10.7 MHz unlike the prior art, the arrangement of the receiver may be simplified, and the cost of the receiver may be reduced. Also, according to this embodiment, since the prior-art demodulator 34 shown in FIG. 7 may be used as the demodulator 4, the cost of the receiver may be reduced also from this standpoint.

Figure 3:
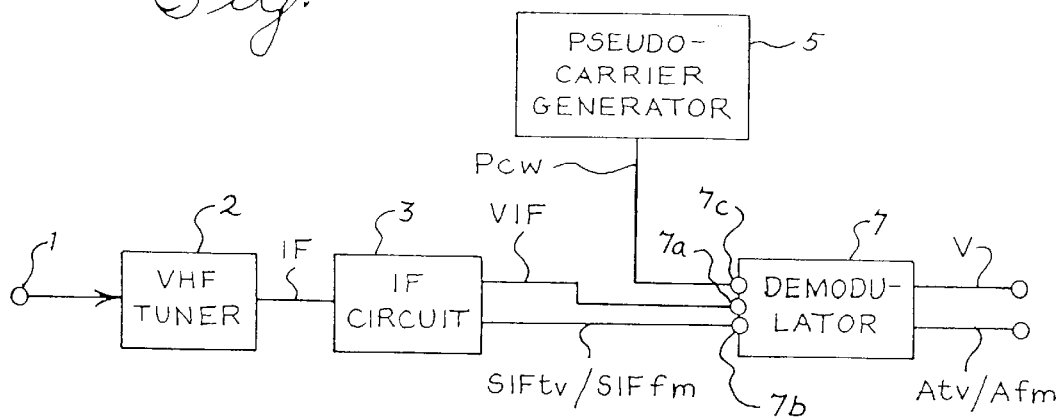
FIG. 3 is a block diagram showing a television signal and FM broadcast signal receiver according to a second embodiment of the present invention.
Figure 4:
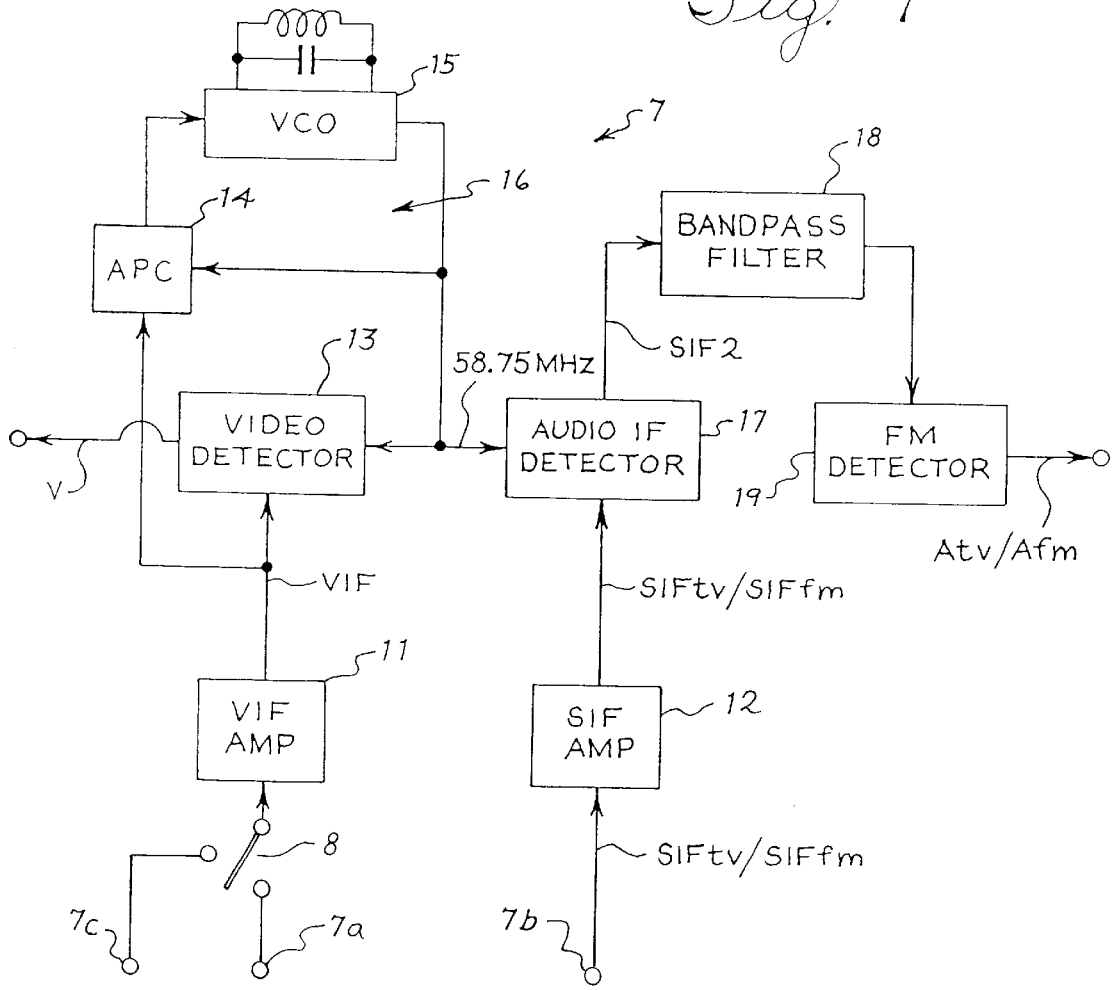
FIG. 4 is a circuit diagram showing a demodulator of the present invention for use in the television signal and FM broadcast signal receiver according to the second embodiment of the present invention.

Next, a television signal and FM broadcast signal receiver according to a second embodiment of the present invention and a demodulator of the present invention for use in the television signal and FM broadcast signal receiver according to the second embodiment will be described with reference to FIGS. 3 and 4. In FIGS. 3 and 4, elements and parts identical to those of FIGS. 1 and 2 are marked with the same references, and therefore need not be described.

Initially referring to FIG. 3, a demodulator 7 includes a first input terminal 7a, a second input terminal 7b and a third input terminal 7c. The video intermediate frequency signal VIF from the intermediate frequency circuit 3 is inputted to the first input terminal 7a. The audio intermediate frequency signals SIFtv, SIFfm are inputted to the second input terminal 7b. Further, the pseudo carrier Pcw from the pseudo carrier generator 5 is inputted to the third input terminal 7c.

As shown in FIG. 4, the demodulator 7 includes a change-over switch 8 connected between a video intermediate amplifier 11 and the first and third input terminals 7a, 7c. The change-over switch 8 connects the first input terminal 7a and the video intermediate frequency amplifier 11 to receive the television signal, and connects the third input terminal 7c and the video intermediate frequency amplifier 11 to receive the FM broadcast signal. As a consequence, when the television signal is received, the video intermediate frequency signal VIF from the intermediate frequency circuit 3 is inputted through the change-over. switch 8 and the video intermediate frequency amplifier 11 to the video detector 13 and the APC 14. When the FM broadcast signal is received, the pseudo carrier Pcw from the pseudo carrier generator 5 is inputted through the video intermediate frequency amplifier 11 to the video detector 13 and the APC 14. Accordingly, the demodulator 7 shown in FIG. 4 becomes the same one as that obtained when the change-over switch 6 shown in FIG. 2 is assembled into the demodulator 4. The connection of the intermediate frequency circuit 3 and the demodulator 7 may be simplified by forming the demodulator 7 into an integrated circuit.

Figure 2:
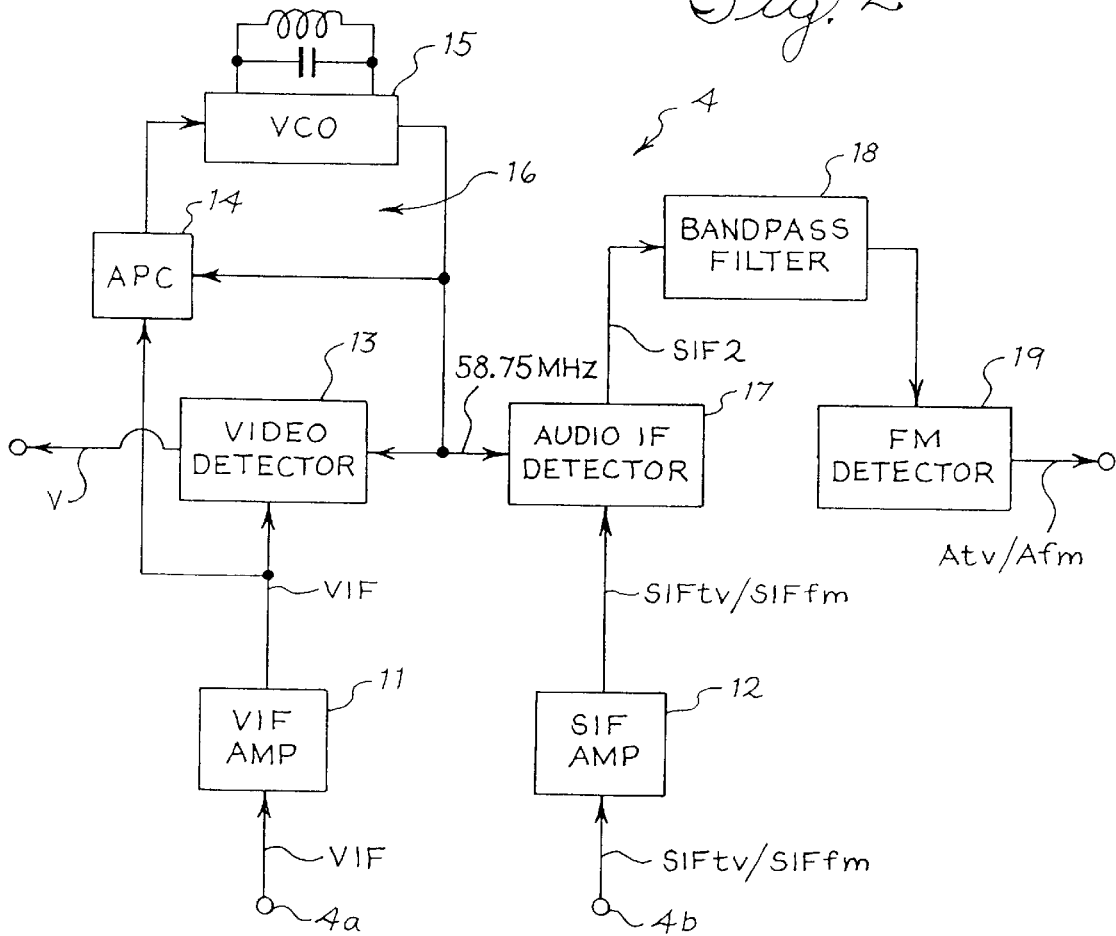
FIG. 2 is a circuit diagram showing a demodulator for use in the television signal and FM broadcast signal receiver according to the first embodiment of the present invention.

In the television signal and FM broadcast signal receiver according to the second embodiment, although the demodulator 7 becomes different in configuration from the demodulator 4 of the television signal and FM broadcast signal receiver according to the first embodiment shown in FIGS. 1 and 2, the overall arrangement of the receiver becomes the same so that the television audio signal Atv and the FM audio signal Afm may be detected and outputted by commonly using the demodulator 7.

Figure 5:
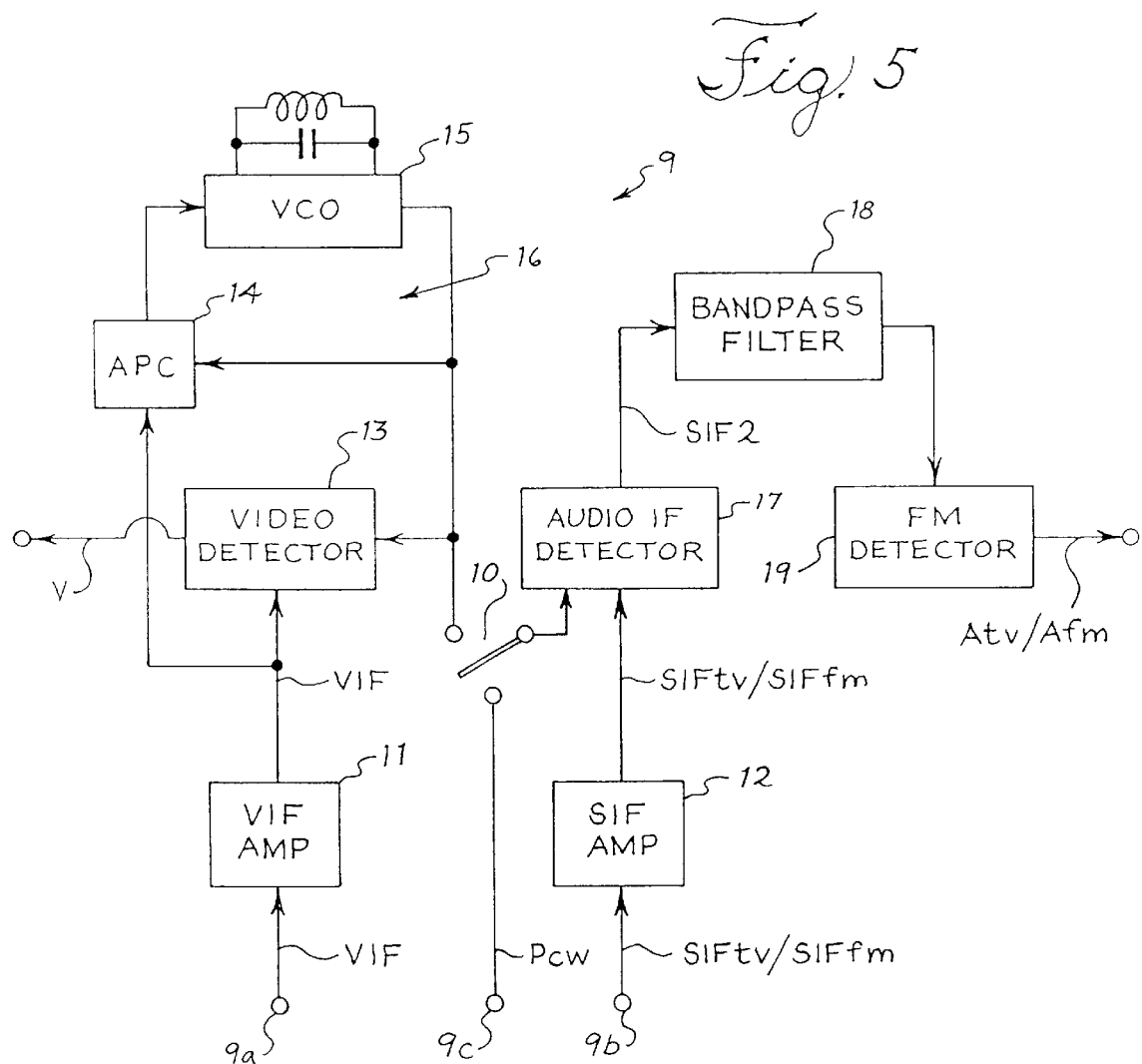
FIG. 5 is a circuit diagram showing a demodulator of the present invention for use in the television signal and FM broadcast signal receiver according to the second embodiment of the present invention.
Figure 6:
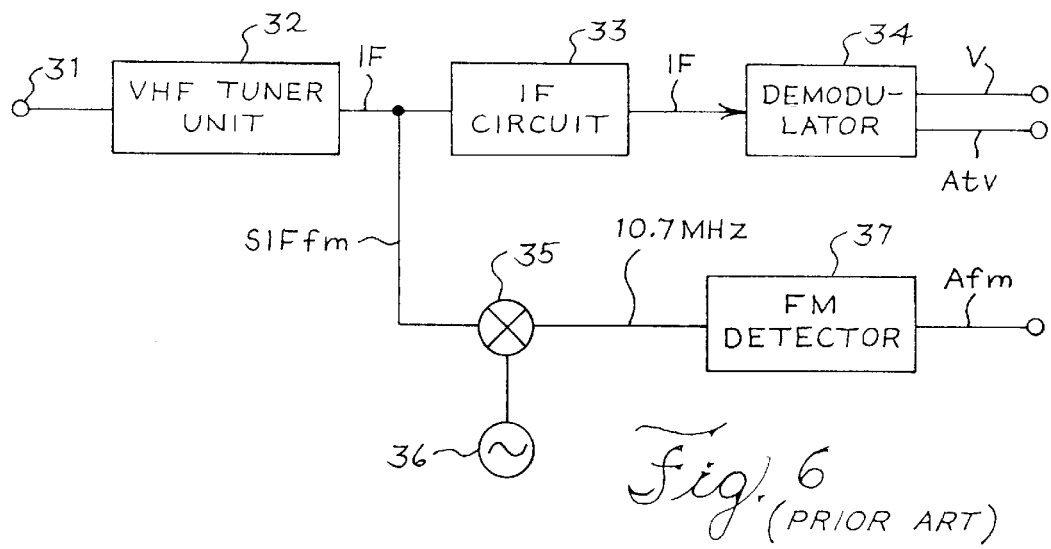
FIG. 6 is a block diagram showing a television signal and FM broadcast signal receiver according to the prior art.

Incidentally, the television signal and FM broadcast signal receiver may be arranged by using a demodulator 9 shown in FIG. 5 instead of the demodulator 7 shown in FIGS. 3 and 4. Specifically, as shown in FIG. 5, the demodulator 9 includes a first input terminal 9a, a second input terminal 9b and a third input terminal 9c. The video intermediate frequency signal VIF from the intermediate frequency circuit 3 is inputted to the first input terminal 9a. The television audio intermediate frequency signal SIFtv or the FM audio intermediate frequency signal SIFfm is inputted to the second input terminal 9b. Further, the pseudo carrier Pcw from the pseudo carrier generator 5 is inputted to the third input terminal 9c.

Furthermore, the demodulator 9 include a change-over switch 10 connected between the VCO 15 and the audio intermediate frequency detector 17. The change-over switch 10 connects the VCO 15 and the audio intermediate frequency detector 17 to receive the television signal. The change-over switch 10 connects the third input terminal 9c and the audio intermediate frequency detector 17 to receive the FM broadcast signal.

As a consequence, when the television signal is received, the video carrier from the VCO 15 is inputted through the change-over switch 10 to the intermediate frequency detector 17. The audio intermediate frequency detector 17 outputs the second audio intermediate frequency signal SIF2 having the frequency of 4.5 MHz. Further, the FM detector 19 detects the second audio intermediate frequency signal SIF2 to provide the television audio signal Atv. Also, since the video carrier from the VCO 15 is inputted to the video detector 13, the video detector 13 outputs the video signal V.

On the other hand, when the FM broadcast signal is received, the pseudo carrier Pcw from the pseudo carrier generator 5 is inputted through the third input terminal 9c and the change-over switch 10 to the audio intermediate frequency detector 17. Then, the audio intermediate frequency detector 17 outputs the second audio intermediate frequency signal SIF2 having the frequency of 4.5 MHz, and the FM detector 19 detects the second audio intermediate frequency signal SIF2 to provide the FM audio signal Afm. In the receiver using the demodulator 9, the connection of the intermediate frequency circuit 3 and the demodulator 9 may be simplified by forming the demodulator 9 into the integrated circuit.

As set forth above, since the television signal and FM broadcast signal demodulator according to the present invention includes the first input terminal, the second input terminal and the third input terminal and in which the change-over switch connects the first input terminal, the video detector and the video carrier generator to receive the television signal and the change-over switch connects the third input terminal, the video detector and the video carrier generator to receive the FM broadcast signal, if the video intermediate frequency signal is inputted to the first input terminal, the television audio intermediate frequency signal and the FM audio intermediate frequency signal are inputted to the second input terminal and the pseudo carrier generator is connected to the third input terminal, then when the television signal is received, the audio intermediate frequency detector outputs the second audio intermediate frequency signal based on the video carrier reproduced from the video carrier generator, and when the FM broadcast signal is received, the audio intermediate frequency detector outputs the second audio intermediate frequency signal based on the pseudo carrier. Therefore, the television audio signal and the FM audio signal may be obtained by the common demodulator. Also, the connection between the intermediate frequency circuit and the demodulator may be simplified.

Also, since the television signal and the FM broadcast signal demodulator according to the present invention includes the first input terminal, the second input terminal and the third input terminal and in which the change-over switch connects the video carrier generator and the audio intermediate frequency detector to receive the television signal and the change-over switch connects the third input terminal and the audio intermediate frequency detector to receive the FM broadcast signal, if the video intermediate frequency signal is inputted to the first input terminal, the television audio intermediate frequency signal and the FM audio intermediate frequency signal are inputted to the second input terminal and the pseudo carrier generator is connected to the third input terminal, then when the FM broadcast signal is received, the pseudo carrier is directly inputted to the audio intermediate frequency detector so that the television audio signal and the FM audio signal may be obtained by the common demodulator. Also, the connection between the intermediate frequency circuit and the demodulator may be simplified.

Then, since the television signal and FM broadcast signal receiver according to the present invention includes the VHF tuner unit for frequency-converting the inputted television signal or FM broadcast signal to provide the television intermediate frequency signal, the demodulating unit for demodulating the intermediate frequency signal to provide the television video signal and audio signal and the pseudo carrier generator and in which the pseudo carrier is inputted to the audio intermediate frequency circuit instead of the video carrier based on the intermediate frequency signal when the FM broadcast signal is received, the audio intermediate frequency detector may obtain the FM audio signal by intercarrier-detecting the audio intermediate frequency signal in the same manner as that used when the television signal is received. Therefore, the mixer for frequency-converting the FM audio intermediate frequency signal to provide the signal of 10.7 MHz or the like is not required, the receiver may be simplified in arrangement, and the receiver may become inexpensive.

Further, in the television signal and FM broadcast signal receiver according to the present invention, when the television signal is received, the video intermediate frequency signal is inputted to the video detector and the video carrier generator by the change-over switch which selects either the video intermediate frequency signal or the pseudo carrier. When the FM broadcast signal is received, the pseudo carrier is inputted to the video detector and the video carrier generator and the pseudo carrier signal from the video carrier generator is inputted to the audio intermediate frequency detector by the change-over switch. Thus, the video carrier generator inputs the carrier to the audio intermediate frequency detector in any case when the television signal is received or when the FM broadcast signal is received. Therefore, it is possible to obtain the FM audio signal similarly to the case where the television audio signal is received.

Furthermore, since the television signal and FM broadcast signal receiver according to the present invention includes the change-over switch connected between the video carrier generator and the audio intermediate frequency detector and in which the video carrier from the video carrier generator is inputted to the audio intermediate frequency circuit by the change-over switch when the television signal is received and the pseudo carrier from the pseudo carrier generator is inputted to the audio intermediate frequency detector by the change-over switch when the FM broadcast signal is received, when the FM broadcast signal is received, the pseudo carrier may be directly inputted to the audio intermediate frequency detector.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A television signal and FM broadcast signal demodulator comprising:

a first input terminal to which a video intermediate frequency signal in a television intermediate frequency signal is inputted;

a second input terminal to which an audio intermediate frequency signal in said television intermediate frequency signal or an FM broadcast signal, which is frequency-converted so as to have the same frequency as that of said audio intermediate frequency signal, is inputted;

a third input terminal to which a pseudo carrier having the same frequency as that of a video carrier in said television intermediate frequency signal is inputted;

a change-over switch for selecting either said video intermediate frequency signal inputted to said first input terminal or said pseudo carrier inputted to said third input terminal;

a video detector to which one of said video intermediate frequency signal and said pseudo carrier selected by said change-over switch is inputted;

an audio intermediate frequency detector to which said audio intermediate frequency signal or said FM broadcast signal inputted to said second input terminal is inputted and generating a second audio intermediate frequency signal;

an FM detector for detecting said second audio intermediate frequency signal to provide an audio signal; and a video carrier generator to which one signal selected by said change-over switch is inputted, reproducing said video carrier and inputting said reproduced video carrier into said video detector and said audio intermediate frequency detector, wherein said change-over switch connects said first input terminal, said video detector and said video carrier generator to receive said television signal and said change-over switch connects said third input terminal, said video detector and said video carrier generator to receive said FM broadcast signal.

2. A television signal and FM broadcast signal demodulator comprising:

a first input terminal to which a video intermediate frequency signal in a television intermediate frequency signal is inputted;

a second input terminal to which an audio intermediate frequency signal in said television intermediate frequency signal and an FM broadcast signal, which is frequency-converted so as to have the same frequency as that of said audio intermediate frequency signal, are inputted;

a third input terminal to which a pseudo carrier having the same frequency as that of a video carrier in said television intermediate frequency signal is inputted;

a video detector to which said video intermediate frequency signal inputted to said first input terminal is inputted and outputting a video signal;

an audio intermediate frequency detector to which said audio intermediate frequency signal and said FM broadcast-signal inputted to said second input terminal is inputted and generating a second audio intermediate frequency signal;

an FM detector for detecting said second audio intermediate frequency signal to provide an audio signal;

a video carrier generator to which said video intermediate frequency signal is inputted, reproducing said video carrier and inputting said reproduced video carrier into said video detector; and a change-over switch connected between said video carrier generator and said audio intermediate frequency detector, wherein said change-over switch connects said video carrier generator and said audio intermediate frequency detector to receive said television signal and said change-over switch connects said third input terminal to said audio intermediate frequency detector to receive said FM broadcast signal.

3. A television signal and FM broadcast signal receiver comprising:

a VHF tuner unit to which a television signal or an FM broadcast signal is inputted and frequency-converting said inputted television signal or FM broadcast signal to provide an intermediate frequency signal having a television intermediate frequency;

a demodulating unit for demodulating said intermediate frequency signal to provide a television video signal and audio signal; and a pseudo carrier generator for generating a pseudo carrier having the same frequency as that of a video carrier in said intermediate frequency signal, wherein said demodulating unit includes a video detector to which a video intermediate frequency signal in said intermediate frequency signal is inputted and outputting a video signal, a video carrier generator to which said video intermediate frequency signal is inputted and reproducing said video carrier based on said inputted video intermediate frequency signal, an audio intermediate frequency detector to which an audio intermediate frequency signal in said intermediate frequency signal and said video carrier reproduced by said video carrier generator are inputted and outputting a second audio intermediate frequency signal, and an FM detector for detecting said second audio intermediate frequency signal to provide an audio signal and in which when said FM broadcast signal is received, said pseudo carrier is inputted to said audio intermediate frequency detector instead of said video carrier based on said intermediate frequency signal.

4. A television signal and FM broadcast signal receiver according to claim 3, further comprising a change-over switch for selecting either said video intermediate frequency signal or said pseudo carrier and wherein said change-over switch inputs said video intermediate frequency signal into said video detector and said video carrier generator when said television signal is received, said change-over switch inputs said pseudo carrier into said video detector and said video carrier generator and said pseudo carrier from said video carrier generator is inputted to said audio intermediate frequency detector when said FM broadcast signal is received.

5. A television signal and FM broadcast signal receiver according to claim 3, further comprising a change-over switch connected between said video carrier generator and said audio intermediate frequency detector and wherein said change-over switch inputs said video carrier from said video carrier generator into said audio intermediate frequency detector when said television signal is received, and said change-over switch inputs said pseudo carrier from said pseudo carrier generator into said audio intermediate frequency detector when said FM broadcast signal is received.

* * * * *

UNITED STATES PATENT AND TRADEMARK OFFICE
CERTIFICATE OF CORRECTION

PATENT NO.    : 6,353,462 B1
DATED         : March 5, 2002
INVENTOR(S)   : Shigeru Osada et al.

It is certified that error appears in the above-identified patent and that said Letters Patent is hereby corrected as shown below:

Title page,
Item [56], References Cited, under FOREIGN PATENT DOCUMENTS,
delete "KP" and substitute -- JP -- in its place.

Column 11,
Line 13, delete "broadcast-signal" and substitute -- broadcast signal -- in its place.
Line 35, delete "frequency-converting" and substitute -- frequency converted -- in its place.

Signed and Sealed this

Twenty-third Day of July, 2002

*Attest:*

JAMES E. ROGAN
*Attesting Officer*    *Director of the United States Patent and Trademark Office*